Patented Jan. 8, 1924.

1,479,851

UNITED STATES PATENT OFFICE.

ROD A. DEMME, OF NEW YORK, N. Y., ASSIGNOR TO DARCO CORPORATION, OF NEW YORK, N. Y., A CORPORATION OF DELAWARE.

DECOLORIZING CARBON AND METHOD OF MAKING SAME.

No Drawing.   Application filed July 23, 1920.   Serial No. 398,504.

*To all whom it may concern:*

Be it known that I, ROD A. DEMME, a citizen of Switzerland, residing at New York, in the county of New York and State of New York, have invented certain new and useful Improvements in Decolorizing Carbons and Methods of Making Same, of which the following is a specification.

This invention relates to decolorizing carbon and methods of making same; and it comprises as a new decolorizing material, granulated shale containing a highly adsorbent form of carbon and free of volatile carbonaceous bodies, and of matters soluble in hot water and in acid; and it also comprises a method of making such a material wherein an oil shale is freed as thoroughly as practicable of volatile hydrocarbons, is then highly heated in a current of dry steam or the like to clean out its pores and is finally extracted with acid to get rid of reactive mineral matters; all as more fully hereinafter set forth and as claimed.

Oil shales are argillaceous materials differing mainly from other shales and slates in that they contain large proportions of hydrocarbonaceous matter intimately and uniformly distributed therethrough. As is well known, by proper distillation methods they give considerable yields of oils of the general character of petroleum oils, containing paraffin, lubricating oils, kerosene, gasoline, etc. The proportion of mineral matter present is always large. On distillation a residue of a porous nature containing fixed carbon is left; the porosity being in part due to the loss of volatile bodies distilled away.

The fixed carbon left after the distillation has excellent decolorizing properties; and I have discovered that these properties may be enhanced by suitable heating and other treatments; giving a material adapted for use for the same purposes for which boneblack is employed, but being of higher decolorizing power. It may also be used for the same purposes as the ordinary decolorizing carbons. In making the material I first heat the shale slowly through a distilling range of temperatures ending about 400° C., giving plenty of time for the extrication of volatile matters. The greater the proportion of volatiles which can be distilled away without yielding carbon by secondary decomposition, the better is the porosity of my final material and the better its decolorizing power. Breaking down of the volatiles with production of secondary carbon begins to be active at about 350° to 400° C.; and it is advisable to have as much as possible of the volatile matter removed before the shale reaches such a heat. Sweeping forward the volatiles as fast as extricated with the aid of a current of dry steam, or inert gases gives improved results.

With some shales the fixed carbon left after the distillation step is improved by what may be called a nitrogenization; by increasing the amount of nitrogen it carries. To this end, the distilled material in granulated form is impregnated with a solution carrying nitrogenous compounds, such as a solution of sodium cyanid, of ammoniacal salts, etc. Ammoniacal gas liquor from the gas works does very well. Ammoniacal tar may be used but is less convenient as carrying volatilizable hydrocarbons.

After the distillation step, it is advantageous to clean out the pores of the material, and to this end it is granulated, if not already in granular form and is heated through a higher range of temperatures, ending at least above 600° C., in the presence of a current of dry steam, hot waste gases (products of combustion) or other suitable carrier; the object being to get rid of any residual high-boiling tarry materials in the pores, carbonizing such as is not volatilized by and carried away with the dry steam, etc. So far as possible it is desirable to volatilize these residual matters rather than carbonize them since carbonization deposits secondary carbon in the pores and, to that extent, clogs them. In using dry steam it is desirable to limit the amount contacted with the carbon at any temperature above, say, 600° C., to prevent removal of too much fixed carbon by the water-gas reaction. The object of the present process is to obtain at this stage a granular material composed of open-textured porous granules carrying a large effective area of active carbon; and it is undesirable either to have the pores clogged with excess secondary carbon or have their active fixed carbon much diminished in quantity.

The advantage of the oil shale for the present purposes is, that when properly carbonized and cleaned out, the material possesses a large effective area of highly active decolorizing and refining carbon; a result connected in some way with the original mutual relationship to each other of the bituminous matter and the mineral matter. This mineral matter is left intact by the present process. Other oil-containing or oil-yielding materials, such as oil sands containing more or less inspissated oil, may be used; but they are not as advantageous as the ordinary oil shales, since the distribution of active carbon in the final material is not as good.

The distillation stage of the process may be conducted in the ordinary shale distilling apparatus with recovery of the products of distillation and the waste product submitted to the further operations described; this being advantageous as cheapening the cost of the decolorizing material. The conditions which are advantageous for removing all volatile matters are also those which are best adapted for giving good recoveries of valuable hydrocarbon oils.

The material made as so far described, is an active decolorizing agent. It however ordinarily contains, because of the composition of the original oil shale, various mineral matters which are best removed; and I therefore give it a final finishing treatment by washing with hot water and with a weak acid, either hot or cold, to remove impurities. It is often desirable to submit the material to sedimentation during the washing operation to get rid of heavy mineral matters. The granular material coming from the cleaning out process is cooled and extracted with water and with acid in any suitable apparatus, washed free of acid, dried, and is then ready for use. It may be ground and powdered to bring it to the same fineness as the ordinary commercial decolorizing carbons.

What I claim is:—

1. The process of making a decolorizing material which comprises destructively distilling oil shale to remove as much as possible of the volatile material, cleaning out the pores of the so-distilled shale at a temperature ranging above 600° C. and removing impurities with weak acid.

2. In the manufacture of decolorizing material, the process which comprises cleaning out the pores of the residue from destructively distilled oil shale by heating the material to a temperature ending above 600° C. in a current of dry steam, cooling the heated material and extracting impurities with acid.

3. The process of utilizing oil shale which comprises distilling away and recovering volatile hydrocarbons therefrom at temperatures not above 400° C., heating the distilled material further to a temperature ending above 600° C. in the presence of a current of dry steam, cooling the material and extracting with acid.

4. The process of utilizing oil shale, which comprises distilling away and recovering volatile hydrocarbons therefrom at temperatures ranging up to about 400° C., impregnating the residues of such distillation with a solution of nitrogenous material, heating such impregnated material further to a temperature above 600° C. in the presence of a current of dry steam, cooling the material and removing mineral impurities with hot water and acid and drying.

5. The process of utilizing oil shale, which comprises distilling away and recovering volatile hydrocarbons therefrom at temperatures ranging up to about 400° C., impregnating the residues of such distillation with ammoniacal liquor, heating such impregnated material further to temperatures above 600° C. in the presence of a current of dry steam, cooling the material, removing the mineral matter by sedimentation, washing with weak acid, drying and grinding.

6. As a new decolorizing material, granulated oil shale freed of volatilizable hydrocarbon material and matters soluble in weak acid, such shale containing a large effective area of highly active carbon.

In testimony whereof, I have hereunto affixed my signature.

ROD A. DEMME.